United States Patent [19] [11] Patent Number: 5,024,302
Karnopp [45] Date of Patent: Jun. 18, 1991

[54] APPARATUS FOR DAMPING COURSES OF MOTION

[75] Inventor: Dean Karnopp, Davis, Calif.

[73] Assignee: Robert Bosch GmbH, Stuttgart, Fed. Rep. of Germany

[21] Appl. No.: 504,201

[22] Filed: Apr. 4, 1990

Related U.S. Application Data

[60] Division of Ser. No. 379,700, Jul. 11, 1989, Pat. No. 4,936,423, which is a continuation of Ser. No. 73,872, Jul. 15, 1987, abandoned, which is a continuation of Ser. No. 851,982, Apr. 14, 1986, abandoned.

[30] Foreign Application Priority Data

Apr. 12, 1985 [DE] Fed. Rep. of Germany ....... 3513128
Jul. 12, 1985 [DE] Fed. Rep. of Germany ....... 3524862

[51] Int. Cl.⁵ .......................... F16F 9/46; F16F 9/34; F16F 9/52
[52] U.S. Cl. ............................... 188/299; 137/625.47; 137/876; 188/319; 188/322.15; 267/127; 280/707
[58] Field of Search ................... 188/299, 319, 322.13, 188/322.14, 322.15, 314, 315; 267/64.19, 64.21, 126, 127; 280/714, 707; 137/625.47, 876

[56] References Cited

U.S. PATENT DOCUMENTS

| 3,807,678 | 4/1974 | Karnopp et al. | 267/126 X |
| 4,620,619 | 11/1986 | Emura et al. | 188/319 |
| 4,722,548 | 2/1988 | Hamilton et al. | 280/714 |
| 4,730,816 | 3/1988 | Eckert | 267/64.11 |

FOREIGN PATENT DOCUMENTS

| 8401605 | 4/1964 | Int'l Pat. Institute | 188/315 |
| 12709 | 4/1971 | Japan | 137/625.47 |

Primary Examiner—George E. A. Halvosa
Attorney, Agent, or Firm—Edwin E. Greigg; Ronald E. Greigg

[57] ABSTRACT

An apparatus for damping movement courses of two bodies, in particular in a vehicle wheel/vehicle suspension system, having a piston sliding in a cylinder and dividing it into two work chambers, the two work chambers arranged to communicate with one another via respective oppositely acting check valves and via a variably asymmetrical damper valve adjustable in such a manner that upon a valve member movement the opening cross section for one flow direction decreases to the extent that it increases for the other flow, direction, such that whenever in comparison with the active damper system energy would have to be supplied from outside, the damper force is substantially reduced to the value of zero.

6 Claims, 9 Drawing Sheets $F_d = B_p V_{rel}$ -passive

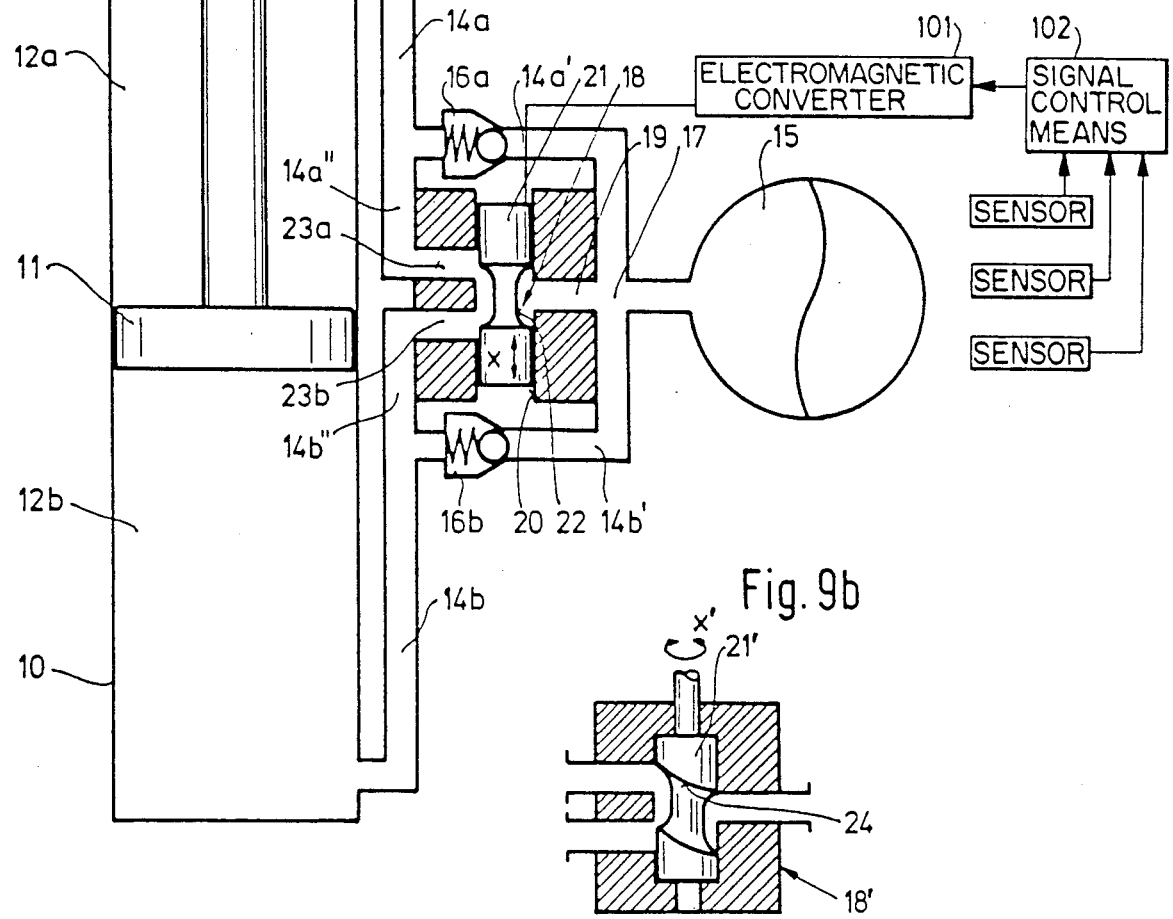

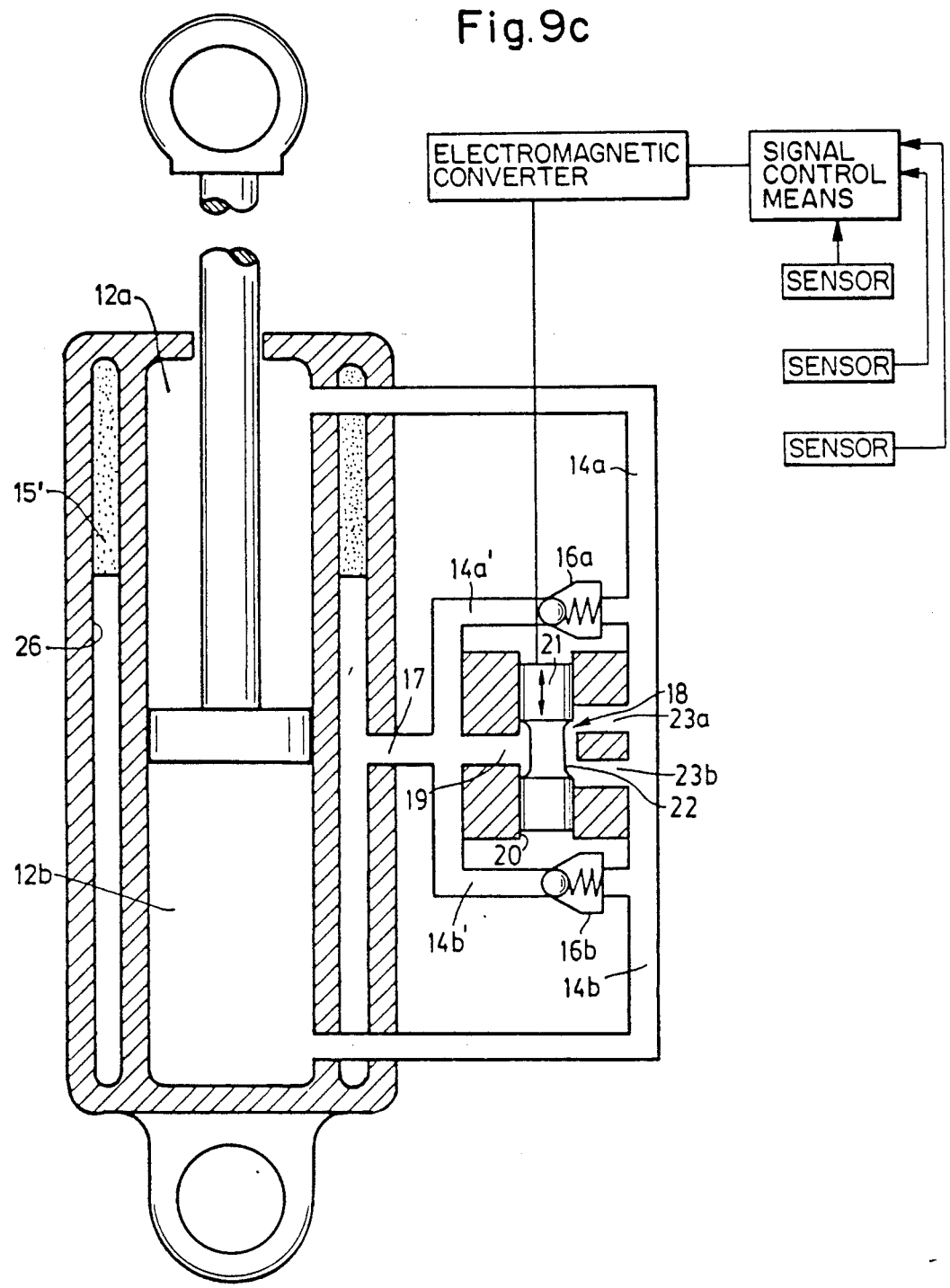

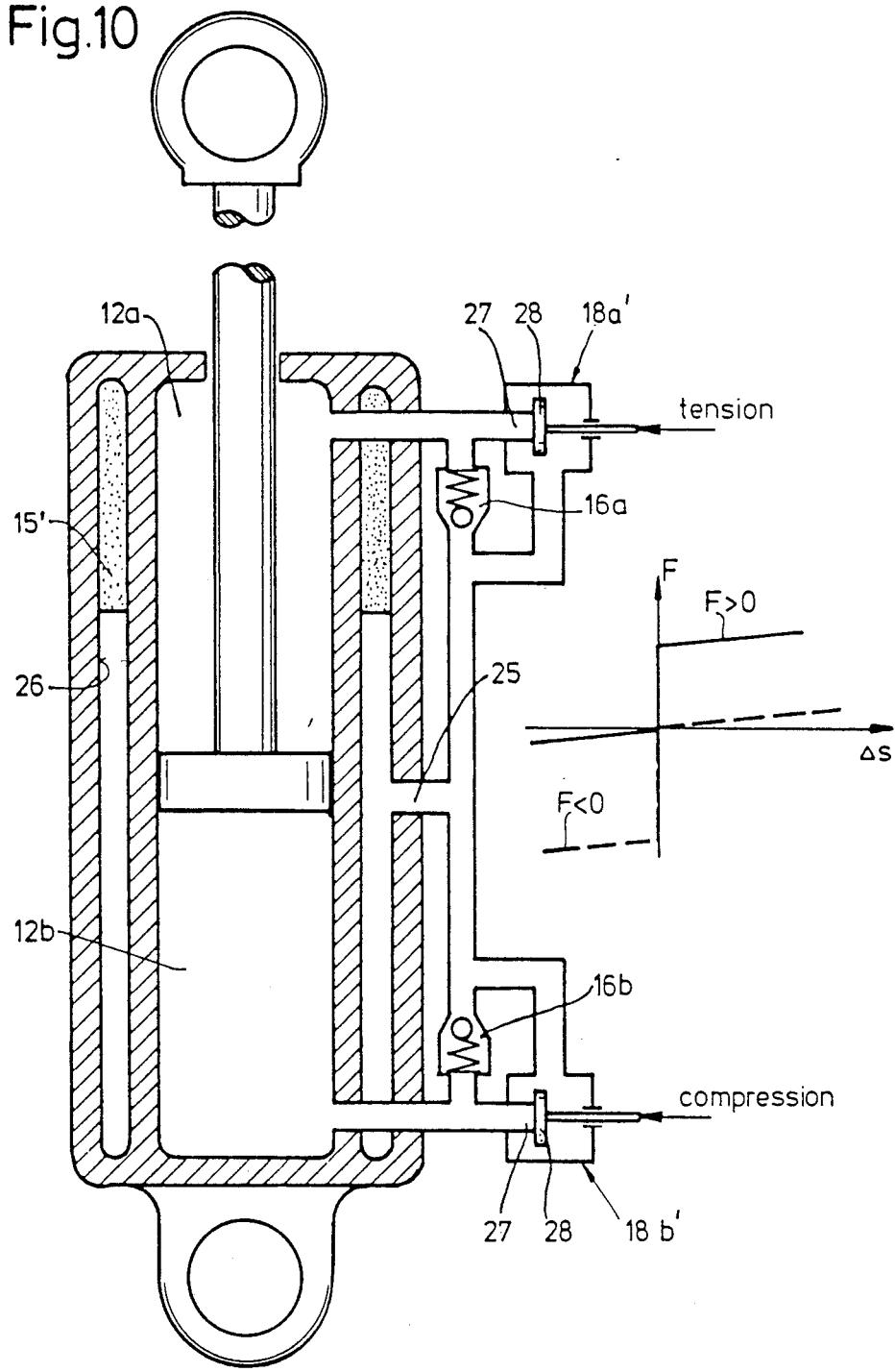

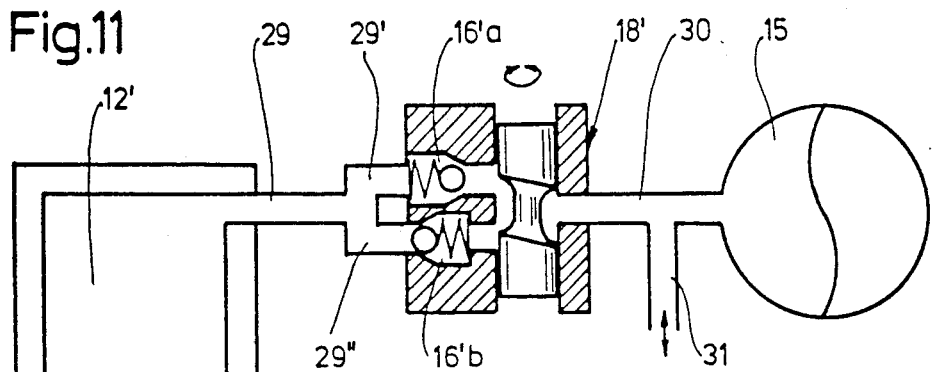
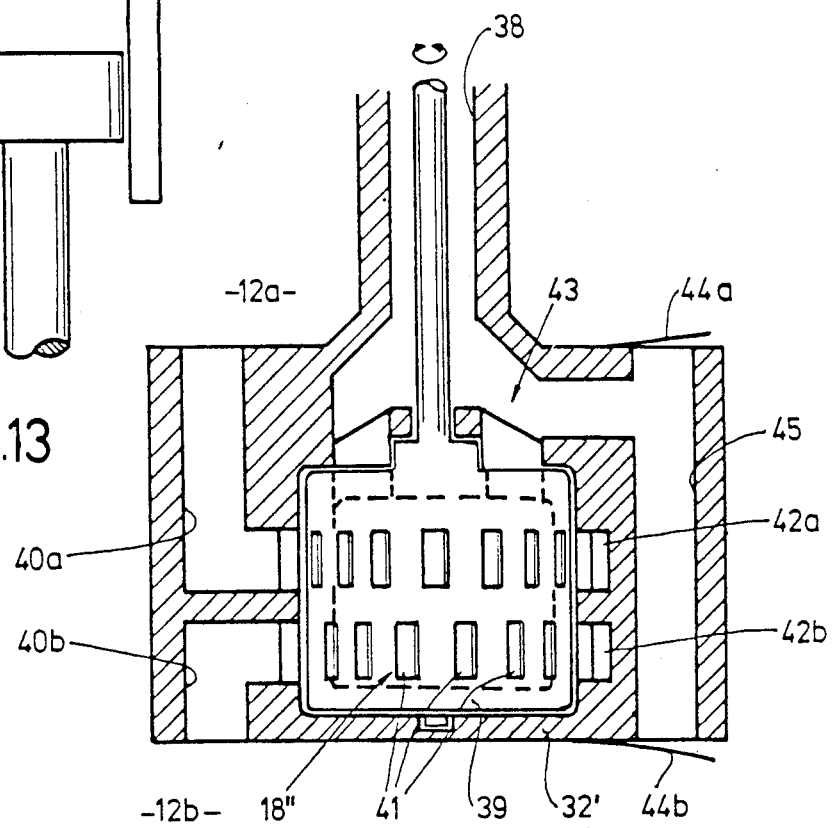

APPARATUS FOR DAMPING COURSES OF MOTION

This application is a division of application Ser. No. 379,700 filed Jul. 11, 1989, now U.S. Pat. No. 4,936,423, which is a continuation of application Ser. No. 073,872 filed Jul. 15, 1987, now abandoned, which is a continuation of application Ser. No. 851,982 filed Apr. 14, 1986, now abandoned.

BACKGROUND OF THE INVENTION

The invention relates to an apparatus for damping courses of motion such as those which occur in vehicle suspension systems. In a known apparatus of this type (U.S. Pat. No. 3,807,678), in a suspension system for two masses, one of which may be one or more wheels of a vehicle and the other of which may be the vehicle body, a standard passive compression spring is disposed between the two masses; this is known as a passive isolator, and a so-called active damper is connected parallel to it. This damper, which has a piston sliding in a cylinder and dividing the cylinder into two working chambers, is considered to be active because of what may be called an active intervention into the damping characteristics, that is, into the volumetric displacement of the pressure medium, is made in the respective working halves of the damper by means of a control function. To this end, the two working chambers are connected crosswise and parallel to each other via opposed valves allowing a flow of pressure medium in only one direction; the amount of pressure medium then allowed to pass through these valves then also becomes "active" by appropriate control of the valves by means of suitably prepared sensor signals. Because in this known suspension system, the spring itself is entirely passive, but the damper is conceived of as being active in terms of its properties, the overall system in this patent is called a semi-active system. However, this term is not semantically related to the dampers of the present invention, which without reference to suspension systems not taken into account are themselves designated as so-called semi-active dampers, for reasons to be explained hereinafter.

It is also known, in wheel suspensions in vehicles, to provide so-called active damping means (see the article, "Active Damping in Road Vehicle Suspension Systems", published in the periodical, Vehicle System Dynamics, 12 (1983), pages 291–316). This publication is referred to also because it includes basic concepts, in theoretically detailed form, applicable in particular to active damping properties.

OBJECT AND SUMMARY OF THE INVENTION

It is accordingly the object of the invention, on the one hand to drastically simplify the design of a damper system, but on the other hand to embody this damper system such that although active energy is not supplied, as actually required for certain conditions, it is nevertheless possible to attain a mode of operation which simultaneously and substantially integrates the properties of passive and active damping systems and thus assures optimal functioning under all conditions.

This object is attained by means of the characteristics revealed hereinafter, with the advantage that on the one hand, the damping forces can be variably adjusted, but may on the other hand, in a desired fashion, also be asymmetrically dimensioned such that the damping concept according to the invention behaves like an active damper, or at least highly approximately like an active damper. That is, damping forces with a predetermined algebraic sign (+ or −) will not be generated whenever an active damping force having the opposite algebraic sign should be required, because of prevailing operating conditions and on the basis of detected sensor signals. The damping system according to the invention is designed such that in this case the damper force becomes zero, or virtually zero.

The supply of energy from outside that is required relates solely to the slight control energies required, for instance in order to specify certain valve positions.

The invention will be better understood and further objects and advantages thereof will become more apparent from the ensuing detailed description of a preferred embodiment taken in conjunction with the drawings.

BRIEF DESCRIPTION OF THE DRAWINGS

FIGS. 9, 9a and 9b illustrate a first practical exemplary embodiment of a semi-active damper having variable, asymmetrical damping behavior, in a schematic sectional view, together with a diagram which plots the course of the damping force exerted over the velocity as well as a further supplementary illustration of an alternative embodiment of the damping valve;

FIG. 9c illustrates a double wall chamber including an annular chambered reservoir as shown in FIG. 10, with the controls as shown in FIG. 9 connected to the annular chambered reservoir.

FIG. 10 shows another exemplary embodiment of a semi-active damper having direct damping force control by means of plate valves, again accompanied by a diagram plotting the course of the damping force over the velocity;

FIG. 11 shows a further exemplary embodiment of a semi-active damper having only one working chamber in the cylinder;

FIG. 13 shows a variant of the arrangement of the valve mechanisms in the piston, again in section.

DESCRIPTION OF THE PREFERRED EMBODIMENTS

The following embodiments first go into some detail in terms of theoretical relationships involved in the general study of damping forces arising in suspension systems. The basis in this context is the model having two masses, as shown in FIG. 1a.

The theoretical considerations that lead to the possibilities for realizing the invention as described below in conjunction with FIGS. 9-14 will now be described in detail using the diagrams of FIGS. 1-8 for explanation. These diagrams serve to provide better understanding of the invention and serve to delineate more clearly the specialized place according to the invention which is occupied by the so-called semi-active damping means according to the present invention.

Figure 1:
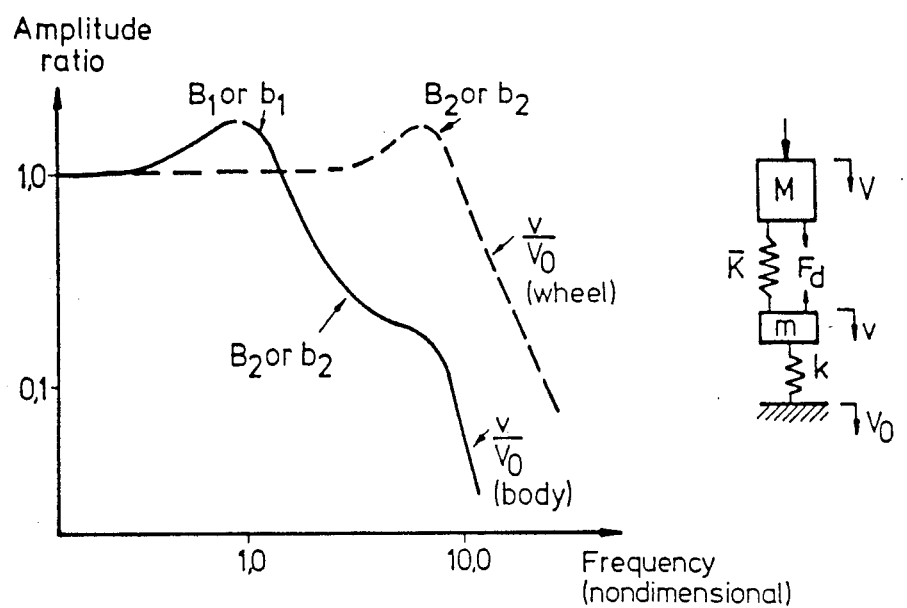
FIG. 1, in the form of a diagram, shows the course of damping amplitude ratios of the main body and the wheel, plotted over the frequency of the forces intervening.
Figure 1A:
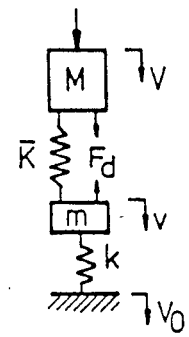
FIG. 1a shows a two mass model.

In the two-mass model shown in FIG. 1a, V indicates the so-called body velocity, which thus, in the specialized application here, is that of the vehicle chassis; v is the wheel speed, and $v_o$ is the speed at entry to the road. As a function of the relative speed $V_{rel} = v - V$, a passive damper would generate a damping force Fd. In the linearized case, a passive damping coefficient can be defined by the following equation:

$$Fd = B_P(v - V) = B_P V_{rel}; \quad B_P > 0 \quad (1)$$

This formula can be generalized using the following equation:

$$Fd = -B1 \cdot V + B2 \cdot v, \quad (2)$$

and then, if $B1 = B2 = B_P$, then the passive case is again involved. However, if B1 differs from B2 ($B1 \neq B2$), then the damper is at least partly active, in the sense that from time to time energy is supplied to the system.

It the damping force is now divided into two terms, which in this sense relate to an active and a passive damping force component, the result is the following formula $$\begin{aligned} Fd &= -B_A V + B_P(v - V), \\ &= -B_A V + B_P V_{rel} \end{aligned} \quad (3)$$

In this equation (3), $B_A$ represents the active damping coefficient and $B_P$ is the passive damping coefficient. Thus $$B1 = B_A + B_P, \quad (4)$$

$$B2 = B_P. \quad (5)$$

In this connection, reference is again made to the above publication, which is named here to provide a still more accurate introduction to and theoretical explanation of damping problems arising in motor vehicles, namely the article by D. Karnopp entitled "Active Damping in Road Vehicle Suspension Systems", published in the journal Vehicle System Dynamics, 12, 1983, pages 291-316. In this publication, the following damping ratios are provided and defined (see page 284):

$$\xi 1 = \frac{B1}{2\sqrt{M\overline{K}}} = \frac{B_A + B_P}{2\sqrt{M\overline{K}}}, \quad (6)$$

$$\xi 2 = \frac{B2}{2\sqrt{mk}} = \frac{B_P}{2\sqrt{mk}}. \quad (7)$$

In these expressions, m and M represent the various wheel and body masses and k and $\overline{K}$ the spring constants of the wheel or of the main suspension. Note in this connection the curve courses shown in FIG. 1, in which the amplitude ratios f are plotted over the non-dimensional frequency. It will be appreciated from FIG. 1 that the wheel and body resonance frequencies are sufficiently well separated, with $\xi 1$ and $\xi 2$ approximately determining the two resonance peaks in the curve course.

The above-mentioned article explains that the need for controlling the wheel resonance by means of B2 or $\xi 2$ leads to the solution of insulating the body in the frequency range between the body resonance and the wheel resonance. Ideally, the reaction of the body to components of road entry factors drops rapidly with the frequency, at frequencies above the body resonance frequency. This means that the suspension can filter out interference that is above 1 or 2 Hz. The wheel resonance can be reduced by increasing B2, which contributes to keeping the wheel in close contact with the road surface; however, the body insulation or suspension becomes worse if B2 is increased.

If in the passive case $B1 = B2 = B_P$, then both the body resonance and the wheel resonance can be reduced by increasing $B_P$; however, this also reduces the body insulation, and results in stiffer suspension or a stiffer ride. In this case, the ratio of $\xi 1$ to $\xi 2$ is $$\frac{\xi 1}{\xi 2} \bigg|_{passive} = \frac{\sqrt{mk}}{\sqrt{M\overline{K}}} = n \cdot e. \quad (8)$$

Here, e is the ratio of masses m/M, and n is the ratio of the undamped and uncoupled natural frequencies, that is, $$n = \omega 2/\omega 1 = \sqrt{k/m} / \sqrt{\overline{K}/M}.$$

If $B2 = B_P$ is made sufficiently large, in order to control the wheel resonance, then B1 can be increased by using an active body velocity feedback, that is, $B_A > 0$. This makes it possible to increase $\xi 1$ (or to decrease the body resonance) without loss of body insulation at frequencies above the body resonance frequency. This is particularly favorable for $\xi 1 < \xi 2$, that is, in the passive case, at which $$n \cdot e < 1 \quad (9)$$

Attention will now be directed to the opportunity provided by the invention of approximately realizing the active damping principle of equation 3 by using a so-called semi-active damping, that is, a damper that has a variable ratio of force to speed, i.e., velocity. Naturally it should be noted here that active dampers are also able to take into account a number of other associated speeds, for instance deriving from rolling and pitching tendencies of the vehicle. The simple two-mass model shown in FIG. 1a does not describe the further degrees of freedom of an actual vehicle; on the other hand, explanation in still further detail is not required for satisfactory understanding of the invention.

In any case, in a semi-active damper there is on the one hand a limitation in terms of the damping force produced, because although such a damper can dissipate or consume force or energy, it cannot generate or supply it; on the other hand, however, this results in many advantages, because a semi-active damping unit with variable damping force, of which manifold forms of embodiment will be described hereinafter, does not require any supply of energy except for an existing control valve, and even if sensor or control units fail it cannot become unstable under any circumstances—something which cannot be precluded in fully-active systems.

Figure 2:
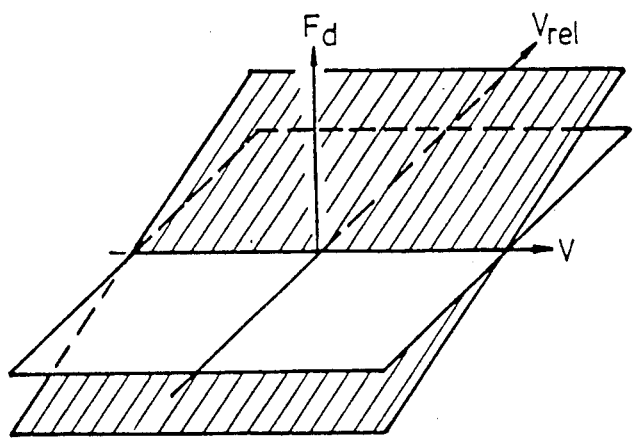
FIG. 2 the form of a diagram, shows the damping force in the so-called $V - V_{rel}$ plane for the passive damping situation, $V_{rel}$ indicating the relative velocity of the masses joined together via the amper and V indicating the body velocity, applied to a vehicle.

The following discussion relates to the damping force principles in the $V-V_{rel}$ plane, with FIG. 2 initially showing the damping force generated by a linear passive damper, where $B_P>0$ and $B_A=0$. The variables V and $V_{rel}$ are used as equivalents to the variables V and v, primarily for the sake of simplification, for the variables V and $V_{rel}$ are in practice always easier to measure than V and v.

Figure 3:
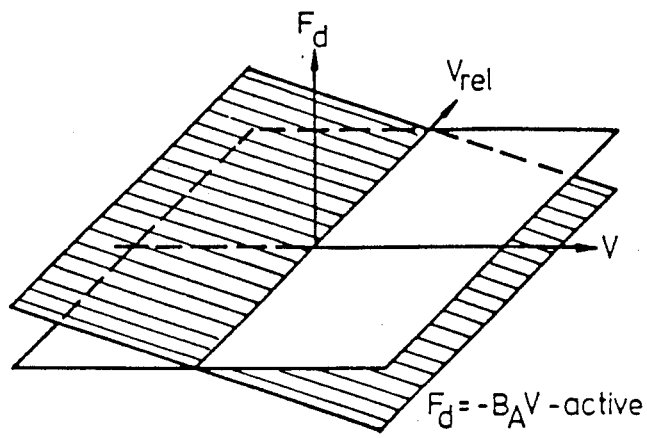
FIG. 3 is a diagram identical to FIG. 2, but for a purely active damping situation.

In contrast to this, FIG. 3 shows the damping force Fd in the $V-V_{rel}$ plane for the purely active case, that is, where $B_a>0$ and $B_P=0$. The above-mentioned article explains in detail that this is a not very realistic case, because here the wheel resonances for typical road/vehicle parameters can be but poorly controlled.

Figure 4:
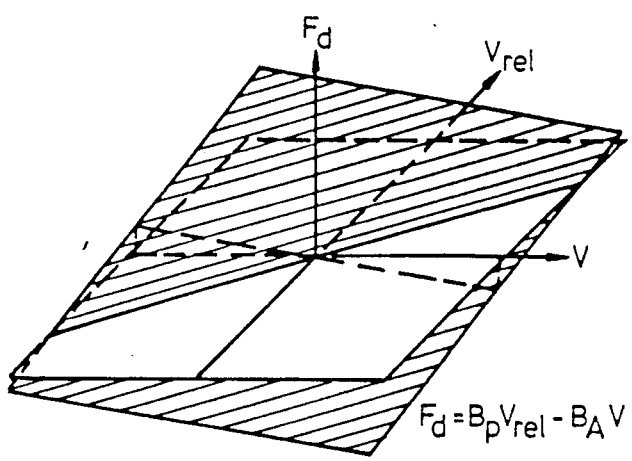
FIG. 4 is a damping force diagram, corresponding to those of FIGS. 2 and 3, in the $V - V_{rel}$ plane for the combined active and passive damping situation.

In FIG. 4, the general case of a combined active and passive damping is shown, where $B_A>0$ and $B_P>0$. This diagram illustrates a damping principle which can be realized using an active force generator that can be programmed or controlled in such a way that a satisfactory generalized form of active damping can be attained. This form is called "active damping" because only speeds appear in the equation for the force. A generalized active suspension force with feedback of status variables, by comparison, also includes terms relating to steering deflections.

Looking now to the power associated with the damping Fd, this should be positive if it is destroyed (dissipated), that is, if it is carried away by damping; the result is then the following equation:

$$Pdiss = Fd \cdot Vrel = -B_A V Vrel + B_P V^2 rel. \quad (10)$$

Figure 5:
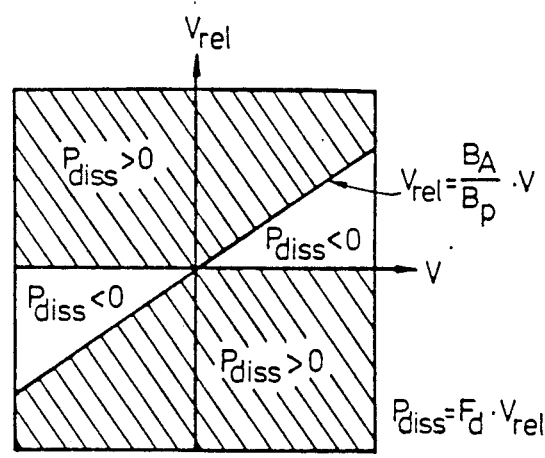
FIG. 5 is an illustration of areas in the $V - V_{rel}$ plane, where energy is supplied in the event of damping and where energy is destroyed.

This means that in certain areas of the $V-V_{rel}$ plane, power is destroyed, and in certain areas power must be supplied (Pdiss<0). FIG. 5 shows these areas for the case where $B_A$ is somewhat less than $B_P$. For a passive damper, or for the semi-active damper under consideration here, in which the damping is supposed to be variable, Pdiss is always greater than or equal to 0. This means that in all the shaded areas in the plane shown in FIG. 5, a semi-active damper can generate the same damping force as an active system; for the unshaded areas, however, this is not possible. In other words, in the open or unshaded areas of FIG. 5, every passive or semi-active damper would generate a force having the opposite algebraic sign from that of the active damping force of equation 1.

FIG. 5 also shows that whenever $B_A=0$, the entire plane is shaded, and power is dissipated everywhere. On the other hand, even when $B_P=0$ and $B_A>0$, half of the $V-V_{rel}$ plane would continue to be shaded. This means that even for the purely active case the active damping force generator will act as a passive damper during substantial periods of time. For the case shown in FIG. 5, in which $B_A<0$, the result is that in fact only a small area of the $V-V_{rel}$ plane necessitates a supply of energy. Therefore it is an essential concept of the present invention of semi-active damping force generators or dampers that damping forces be generated there, that is, in the shaded areas, such as an active generator would also generate or would have to generate; on the other hand, in the unshaded areas any possible damping force generated by a semi-active damper would have the opposite algebraic sign in terms of the force then desired, so that the invention proposes that in these areas the damping force essentially be reduced to zero, that is, $Fd \simeq 0$. In the case of the structural features of semi-active dampers to be described in greater detail hereinafter, provisions are therefore made so as to assure that the term $Fd \simeq 0$ is always attained whenever energy would have to be supplied in order to generate the desired controlled damping force. Experiments, which also include computer simulations, have shown that even if the proposed provisions of a semi-active damping are used but no energy is supplied, substantial advantages of an active speed feedback are still retained.

The illustrations given here relate solely to linear regulators; it is understood, however, that an appropriate extension to concepts of nonlinear regulation is also possible. For example, if it should be desirable to specify a different passive coefficient for tensile force and compression force, then the unshaded areas for Pdiss<0 in FIG. 5 in the upper and lower halves of the plane shown would differ from what is shown, because the damping force function (Fd function) as shown in FIG. 4 would then be illustrated by two planes joined at $V_{re}=0$. Still more complicated nonlinear force functions would then generate curved configurations at the threshold transitions of FIG. 5.

In the following, more detail will be given as to possible modulation schemes for semi-active dampers, together with tangible ways to attain such semi-active systems, so that in the areas shown in FIGS. 4 and 5 a semi-active damper will generate exactly the same damping force effect as an active force generator. Some possibilities are indicated or approximating a semiactive damper by appropriate control or monitoring of the behavior of an active element. Naturally, it is possible in so doing to cause an active damper to generate force in accordance with position or acceleration signals (like an active spring or an element having mass); on the other hand, a damping force has a certain phase relationship with position and acceleration variables, which makes it improbable that the damper could be effectively used in this manner.

One possibility for modulating a semi-active damper is in the use of a valve in which the opening for the flow of fluid (pressure medium) is a function of the linear position or angular position of a certain element. Typically, the position of the valve is controlled by an electromagnetic converter. The position can be switched back and forth between two extreme values, or may be varied continuously.

If a linearized valve is taken as an example, in which a damping coefficient can be continuously varied, then it is possible, because fluid resistances have a tendency to have a quadratic pressure/flow ratio, to make a linear coefficient ratio as a precondition, merely as an approximation. The effective damping coefficient Beff will first be defined as follows:

$$Fd = Beff \cdot Vrel = B_p Vrel - B_A V, \quad (11)$$

wherein Beff is varied continuously by correspondingly actuating the valve, that is, $$o < Beff < \infty. \quad (12)$$

Figure 6A:
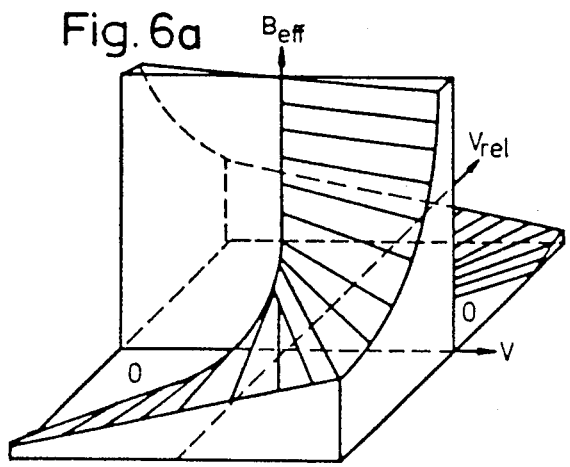
FIG. 6a shows the course of an effective damping coefficient, modulated by sensor signal triggering, in a semi-active damping in the $V - V_{rel}$ plane, in a perspective view for the sake of better comprehension of the concept.
Figure 6B:
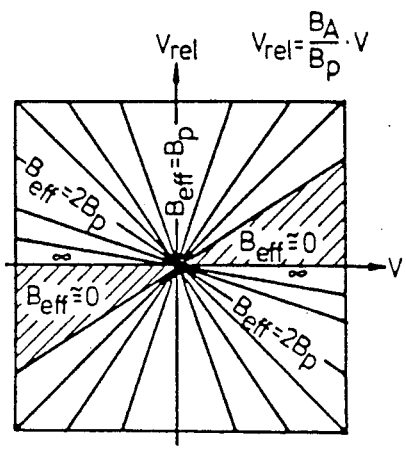
FIG. 6b illustrates a plan view of the diagram.

FIG. 6 shows how the coefficient Beff must be varied, in order to reproduce the damping principle expressed in equation 4 in all the regions of the $V-V_{rel}$ plane in which this is possible. In the areas in which a supply of power or energy is necessary, Beff is then set to zero, that is, Beff≃0, so that a force having the wrong algebraic sign will not be produced in any event.

Some considerations pertaining to the modulation schemes under discussion should first be mentioned, with respect to FIG. 6. The fact that in some regions Bff→∞ is not problematic; this merely means that the flow range must disappear. Adjacent to these areas, the system is comparatively sensitive, and whenever only one valve is to be controlled, a slight change in the relative speed $V_{rel}$ necessitates a very rapid change in the valve opening from nearly zero to fully opened. As long as the valve is never completely closed, this difficulty is only relative, however; naturally the required frequency dependency of the valve has something to do with how fast this switch has to work. Some of the damper/valve embodiments described in greater detail below include check valves, which automatically open whenever the relative speed $V_{rel}$ changes its algebraic sign, and so they therefore perform this switchover automatically. In principle, whenever a force with a given algebraic sign corresponding to equation 3 is required, and $V_{rel}$ changes to another algebraic sign, the result being a force having the opposite algebraic sign, then the check valve opens and changes the damping force to zero (Fd≃0), even in the case where the valve remains in its original position. This helps to overcome undesirable pulse forces in case the valve cannot react fast enough, so that the reaction speed required can be decreased. The two illustrations in FIG. 6, in the upper portion, show the dependency of $$Beff = B_p - B_A \frac{V}{V_{rel}} \geq 0, \quad (13)$$

while in the lower part of FIG. 6—in which the contour lines illustrate a constant Beff—a semi-active damper with a modulated damping coefficient Beff is shown.

Figure 7:
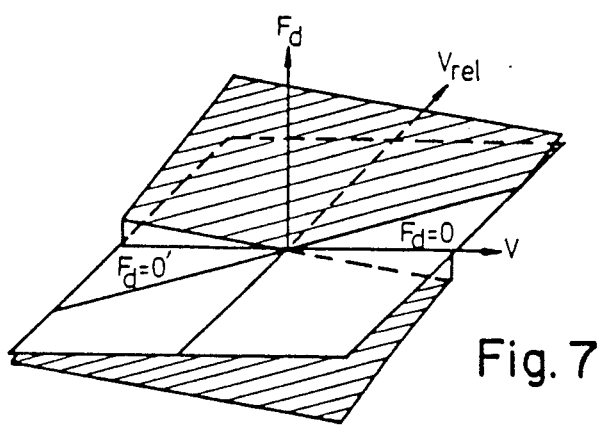
FIG. 7 illustrates the damping force exerted in the $V - V_{rel}$ plane by a semi-active damper having controlled damping force.

Finally, FIG. 7 shows the force generated by an active damper, which is controlled such that the force principle shown in FIG. 4 is always obeyed, whenever this is possible. If it is possible to realize the variable damping coefficients exactly as shown in FIG. 6, then this would be the result. This force principle can also be realized more directly, however, by designing a valve mechanism in which the force is controlled directly. One possible exemplary embodiment is the one shown in FIG. 10 and explained in detail below, in which an electromagnetically control force is supplied to plate valves, which control the cylinder pressure virtually independently of the flow. In this system, a force boost in the ratio of the piston to the valve surface area is built in. Also, the check valves prevent the generation of forces having the wrong algebraic sign, so that the frequency dependency of the electromagnetic force generators do not necessarily need to be particularly high.

Indirect means for attaining the force principle shown in FIG. 7, using valve position modulation, can be realized by using force feedback and the diagram shown in FIG. 6.

At the same time, this would overcome some of the sensitivity problems arising from the coefficient control, but would require a force sensor and a valve control loop which reacts to the measured force.

Figure 8:
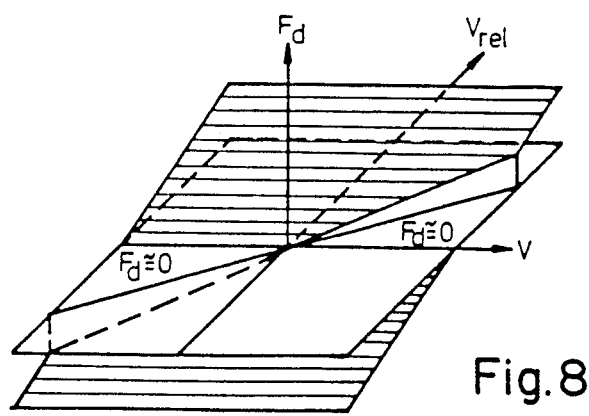
FIG. 8 is the same diagram as FIG. 7 but for the case where a passive damper is merely switched on or off.

FIG. 8, finally, shows a simplified system in which a passive damper is simply switched on and off, on the basis of the active damper control principle. The result is a passive system which is always shut off whenever the active damping force has an algebraic sign opposite that which can be generated passively. In most regions of the $V-V_{rel}$ plane, the influence of the speed V on the damping force Fd is not present; however, in those regions in which the active system would supply energy while a passive system would dissipate it, the semi-active damper is simply shut off. Experiments, in particular utilizing computer simulation models, but in actual operation as well, have shown that even this simplified scheme of FIG. 8 has considerable advantages overall. It should also be noted that all the ensuing exemplary embodiments of semi-active dampers can be operated in this manner.

To summarize thus far, these theoretical considerations demonstrate that in practice, even an active camper, for most of the time it is being used, substantially dissipates power or energy, so that the basic concept according to the invention of a semi-active damper having a modulation on the order of a control or signal output is often capable of generating the same forces as an active damper. In fact, the semi-active damper can at least be shut off whenever an active damper is supplying energy, so that virtually no energy is dissipated. The ensuing discussion relates substantially to the various possibilities for designing and controlling a semi-active damping force generator.

In accordance with the above explanation, the damping force control is effected by evaluating preferably the speed data V, that is—in the present application to motor vehicle suspensions—the absolute velocity of the structure, which in terms of measurement technology can be suitably ascertained for instance with acceleration pickups and ensuing integration, and the relative speed $V_{rel}$ between the body and the wheel, which can also be suitably measured, for instance in a known manner by detecting the signals of position detectors on the wheel and on the body, or the displacement travel of the damper movement, or the like. In the ensuing discussion, such provisions for obtaining sensor signals will be assumed to be known per se (they are also mentioned in U.S. Pat. No. 3,807,678 referred to hereinabove); likewise, the particular type of movements of the various valve members in the semi-active dampers described below will not be addressed in detail, because such movements can be derived from the detected signals in the usual manner, for instance by means of magnets, electromagnetic effects in general, motor control, and the like. All the ensuing forms of embodiment of semi-active dampers have in common the provision of at least one (uncontrolled) check valve as well as a so-called main valve with a variable asymmetrical damping characteristic; a feature of particular importance is the asymmetrical action of this valve in combination with check valves to realize the various damping force curves described in detail above.

The semi-active shock absorber, a form of damper, shown in FIG. 9 can be disposed between a vehicle axle (not shown) and a vehicle body (not shown) and in principle always comprises a cylinder unit 10 and a piston 11 sliding therein, forming two work chambers 12a and 12b, which are separated by the piston and during damper operation are naturally intended to have variable volumes. The piston is supported by a piston rod 11a, which may be secured to the vehicle body, for instance; the cylinder 10 is then disposed on the vehicle axle. The two work chambers 12a and 12b communicate via respective lines 14a, 14b, which in turn are divided into branch lines 14a', 14a" and 14b', 14b", with a reservoir 15 (namely via the branch lines 14a' and 14b"); this reservoir 15 is by way of example hydropneumatic. Respective check valves 16a, 16b are also located in these branch lines, being embodied as spring-biased ball valves, which block the flow of fluid or pressure medium out of the particular associated work chamber (for instance to the reservoir).

Before the reservoir, the two branch lines 14a', 14b' rejoin at 17; the two other branch lines 14a" and 14b" act as inlet or outlet pressure lines to a variable asymmetrical damping valve 18, which, via the junction point 17 and a further line 19, again communicates with the reservoir 15 or with the two other branch lines 14a', 14b'.

In the exemplary embodiment shown in FIG. 9, the asymmetrical damping valve comprises a valve member 21 supported in an axially slidable manner in a cylindrical bore 20; the valve member 21 is again of substantially cylindrical shape but having a restriction 22 in its middle, which then widens frustoconically, for example, to merge with the adjoining sliding faces. The two valve connections 23a and 23b on the same side communicating with the branch lines 14a" and 14b" are offset in terms of positional height in the valve member adjusting movement; the other valve connection 19 is centrally arranged.

The valve 18 shown in FIG. 9 is moved in the direction of the arrow by an electromagnet converter 101 according to electrical signals received from a summation signal control means 102, which receives its signals from sensors which provide output signals indicative of a shock or vibratory condition such as body position, velocity and acceleration. The valve 18 will be moved in the direction of the arrow depending on the receipt of a signal from the signal control means. Such sensors and signal control means have been set forth in U.S. Pat. No. 3,807,678.

The function of the damper shown in FIG. 9 is accordingly such that in an arbitrary position of the valve 21 in one direction, for instance if the shock absorber is compressed when a bump is encountered, pressure medium can flow via the branch line 14b" and via the valve, with a predetermined valve resistance and hence a corresponding damping resistance, into the line 19 and from there via the check valve 16a to the other work chamber, which is intended to represent a damping force that is assumed to be positive. If immediately thereafter ($\Delta \dot{s} < 0$) an even minimal negative damping force should then be required, then the check valve 16b in this case enables the rapid spreading apart of the piston/cylinder unit, since in this case the pressure medium can flow out of the upper work chamber 12a (as seen in the drawing) via the damper valve 18, which because of its asymmetry in this case and in the position it maintains is virtually resistance-free, and via the check valve 16b into the other work chamber. Because of the displaceability of the valve member 21, the variable asymmetrical damping becomes possible. A semi-active damper of this kind is therefore capable of generating the (nonlinear) damping force curves plotted over the speed in the upper right of the diagram, which includes curves having the same shape but drawn in solid lines, broken lines, or a great distance away. If the valve member is for instance located symmetrically in the middle of the connection position ($x=0$), then identical damping forces result for both speed directions; at the various stop positions of the valve member ($x=x_{max}$; $x=x_{min}$), highly non-symmetrical or nonlinear damping forces for the two different speed directions are obtained; see graphic illustration at FIG. 9a.

It will be understood that the variably asymmetrical damper valve 18 can be varied in many ways; for instance, the valve member 21', like the damper valve 18', can be embodied as shown in FIG. 9b. Then the adjusting movement is a rotation x', and the two transitional faces extending obliquely in the same direction on both sides show that the valve assures asymmetrical behavior, which in principle means that the two valve connections 23a, 23b undergo a different flow resistance from the connection 19 on the other side, at a given valve member position; that is, generally stated, the valve has different opening cross sections for the two connections 23a, 23b in each position (except for the middle position).

FIG. 9c illustrates the control valve and control circuits as shown in FIG. 9 with the reservoir 15 removed and the connection for the reservoir connected to an annular chamber 15' surrounding the chamber 10 shown in FIG. 9c. The operation is the same as for FIG. 9 except that the pressure reservoir surrounds the work chamber.

In the explanation of the embodiments below, it will first be noted that the only characteristics to be described will be those that differ from the basic concept described in conjunction with FIG. 9; it is applicable in principle to all the embodiments that they have a built-in asymmetry with respect to the relative speed. If the damper valve then receives an order, for instance a tensile force (tension and pressure, or compression, are used here in terms of the possible factors acting on the damper from outside), then the valve automatically generates only a very slight pressure force, even if the relative speed is in the same direction as the pressure. If such behavior is built into the valve, then the demands on the valve in terms of its frequency response behavior are less, and the regulator or the electrical control circuit can also be simplified.

With the exception of the exemplary embodiment of FIG. 10, in which the valve force is more or less directly controlled, the valve resistance in the other exemplary embodiments is determined by three valve position. In the simplest case, the dampers or control valves can be switched over simply as a consequence of the signal supplied, which signal may for instance be the result of measurement of the absolute body speed. Continuous variations of the valve resistance or of the damper force generated are possible by means of force feedback circuits. An essential feature of the exemplary embodiments described herein is that in combination with the basic valve mechanism, that is, the damper valve, various check valves are provided, so that in general the valve region can be made as intelligent as possible. It should be noted in this connection that a certain, albeit passive, damping contribution (e.g., a force component proportional to or as a function of the relative speed) is always necessary, because of the slight damping properties provided to the unsprung mass via the "tire springing" component, i.e., the tires acting as a spring by their resilience. Therefore, it is unnecessary for the damper valves to function absolutely "perfectly"; in actuality, the damper valves should be mechanically limited by stops, so that the damping principle cannot be varied overly extensively, which otherwise could possibly bring about a dangerous situation in the event of a failure of the control device or if there are malfunctions in the valve itself.

In the exemplary embodiment shown in FIG. 10, the two work chambers, which here again are indicated at 12a and 12b, again communicate directly with one another via the two check valves 16a and 16b and with a hydropneumatic reservoir via a transverse line 25; this compensating reservoir is shifted into an annular recess 26 of the cylinder and is shown at 15'. Parallel to the respective check valves 16a, 16b, as in the exemplary embodiment of FIG. 9, is the damper valve, here divided into zones 18a', 18b', each acting as a plate valve, in which accordingly the valve inlet or outlet 27 can be acted upon for instance by directly electromagnetically controlled forces, which move the valve plate 28 into contact (closure of the valve part) or into a raised position (opening of the valve part). In FIG. 10, the upper valve part 18a' shown is arranged for tensile forces acting upon the damper and its damping, and the lower valve part is arranged for compression, or pressure, forces acting upon the damper. Here, the electromagnetically generated compression or tension control forces are reinforced hydraulically.

The exemplary embodiment of FIG. 11 represents a pressure medium control option that is connected to only one work chamber 12'; a pressure line 29 leading away from the work chamber 12' divides into to partial lines 29' and 29", each having a check valve 16a', 16b' connected in series with a damper valve 18', which has the same reference numeral and is embodied the same as the alternative valve embodiment of FIG. 9, with the same action. The sole valve connection line 30 that continues on communicates with the hydropneumatic reservoir or compensating container 15; a branch line 31 may be connected to a load leveler, not shown.

Figure 12:
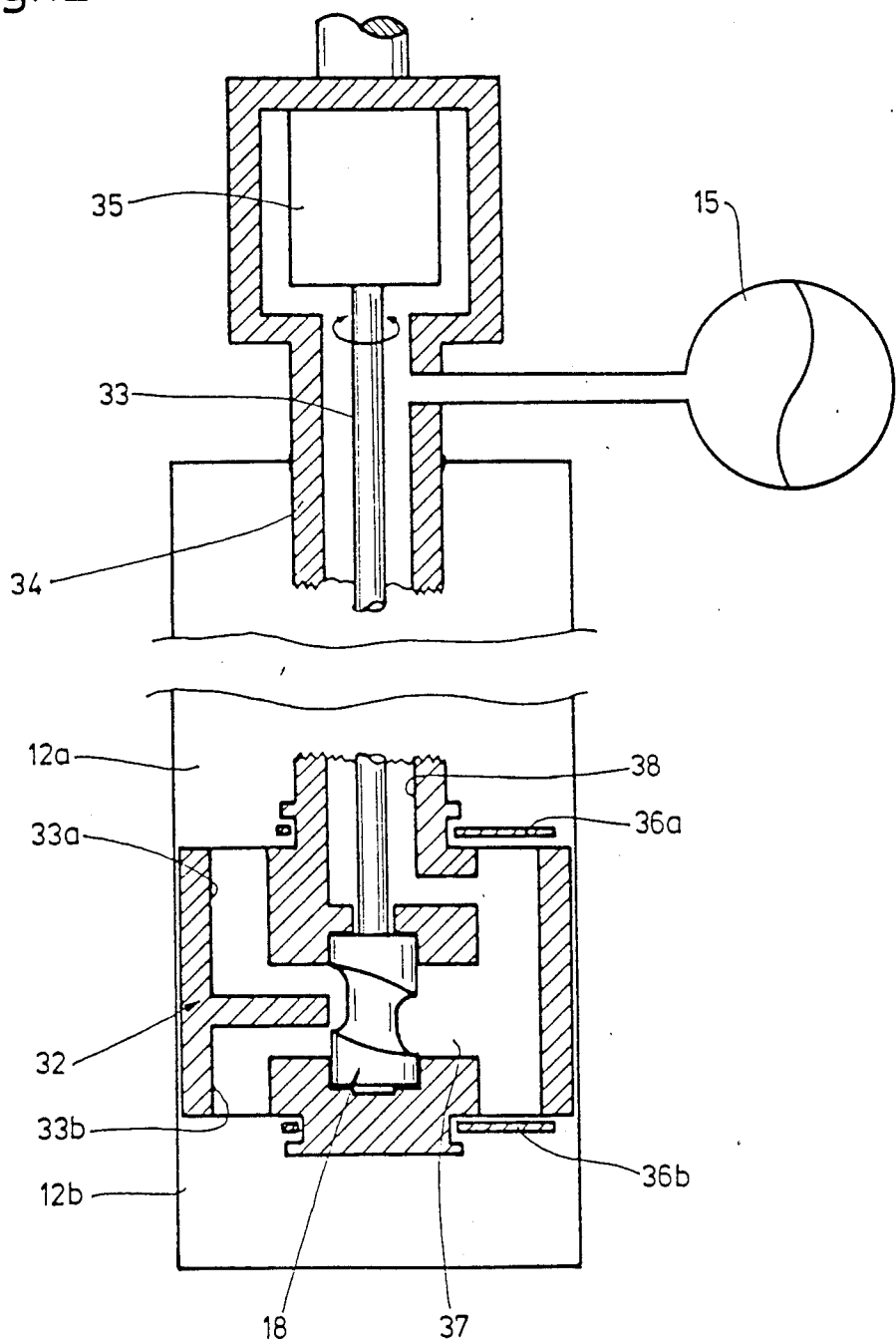
FIG. 12 an exemplary embodiment of a semi-active damper in which the variably asymmetrical valve mechanisms are housed in the piston.

The following exemplary embodiments of FIGS. 12 and 13 differ from those described above in that the entire valve mechanism (check valves and variably asymmetrical damper valve) is disposed in the piston of the damper. The piston is marked 32; it includes openings 33a, 33b at both sides, opening into the work chambers 12a, 12b and leading to a damper valve 18', which corresponds in its fundamental structure and its function to the damper valve 18 already described in conjunction with FIG. 9 and having a rotating member, to which end a control rod 33 is provided, which penetrates the piston and the piston rod 34 and extends to a drive member 35.

The check valves still required here are shown as simple flap-type valves 36a, 36b; they effect communication of the single damper valve connection 37 with the two work chambers 12a, 12b and at the same time via a line 38, initially extending in the interior of the piston rod, with the externally located hydropneumatic reservoir 15. The basic mode of operation of this exemplary embodiment corresponds to that described above; for each flow direction of pressure medium, one check valve and one of the openings of the variably asymmetrical damper valves 18' must be passed through, so that once again the damper forces represented by the various curves in the diagram are obtained.

The valve mechanism shown in FIG. 13 also corresponds in its basic structure and function to the valve mechanism of FIG. 12, with the exception that here, although the damper valve 18" does include a rotating valve member 39, nevertheless it is designed for low pressure and simultaneously large throughput. The lines joining the respective work chambers 12a, 12b to the damper valve are shown at 40a, 40b; they discharge into respective annular recesses in the structure of the piston 32'. The annular recesses are embodied such that they have windows that, depending on the angular position of the rotating valve member 39, which is for example cup-shaped or sleeve-like, are either aligned with window-like flowthrough openings 41 extending over the circumference of the rotating valve (in which case the valve is opened) or are offset with respect to these flowthrough openings (so that the valve is blocked, at least for this connection zone). To realize the asymmetrical valve behavior, the flowthrough window rows in the rotating valve member 39 that are aligned toward the various annular recesses 42a, 42b in the piston are now offset with respect to one another, which can be clearly seen in the drawing if the upper windows are compared with the lower ones. This means that in the two extreme end positions, either only the upper windows, or only the lower windows, or any conceivable combination, can then be aligned for flow of the pressure medium to the corresponding windows in the annular recess, so that the variably asymmetrical behavior is assured. The check valves may be simply resilient flaps 44a, 44b on both sides of the piston, which are capable of opening or closing a common lateral conduit 45 in the piston, depending on the piston movement. This conduit 45 communicates with the one (shared) connection 43 of the damper valve 18"; via a central through opening 38 in the piston rod, the communication is then provided with the hydropneumatic reservoir 15, which is not shown in this exemplary embodiment.

Figure 14:
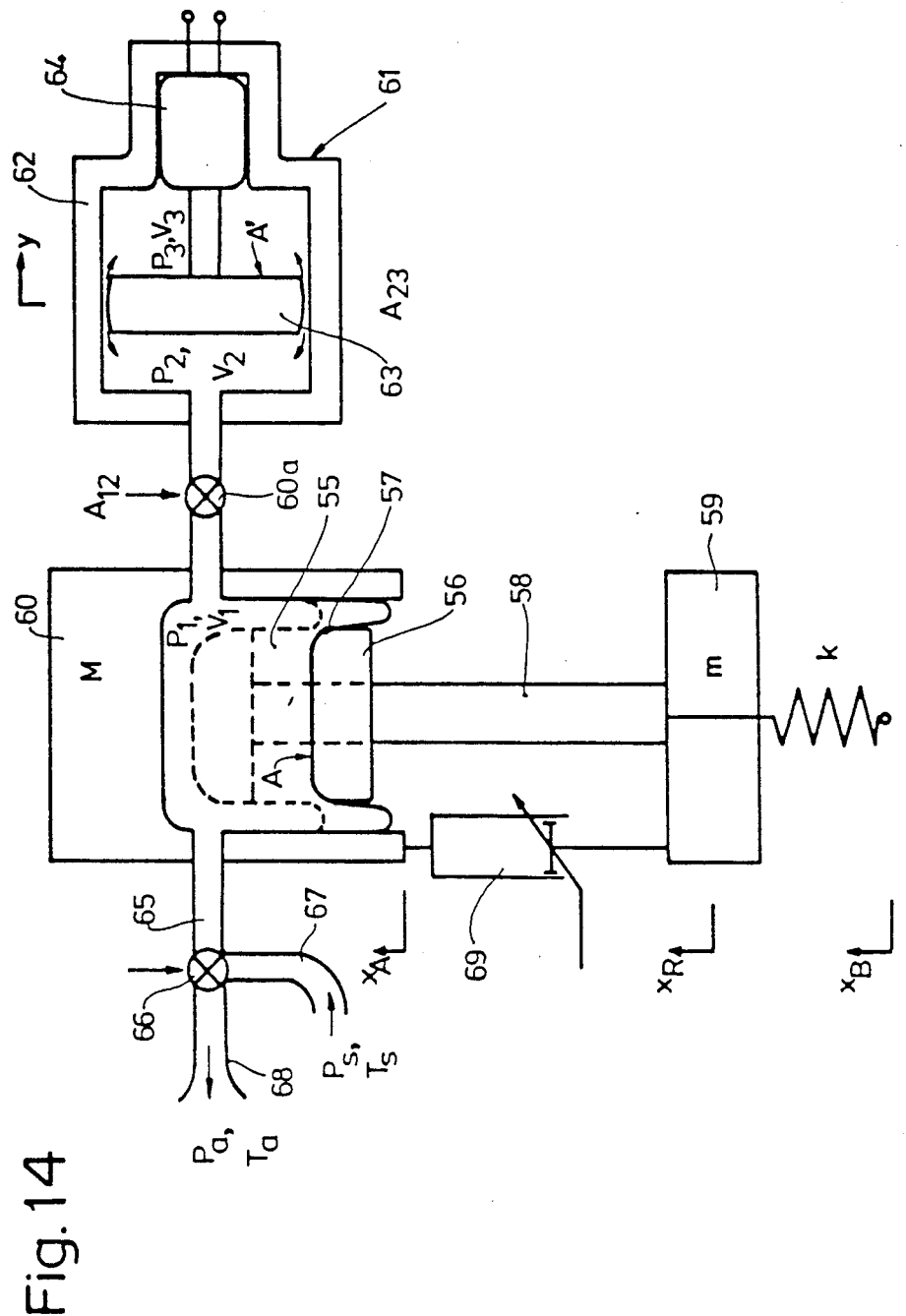
FIG. 14, finally, shows the possible arrangement of the semi-active damper concept according to the invention so as to provide a possible overall suspension concept having air suspension.

Such semi-active dampers having a variably asymmetrical damping behavior can be used for instance in suspension systems of the type schematically shown in FIG. 14. The suspension system shown in FIG. 14 uses air or some other gaseous medium as its pressure medium and contains an essential element in the form of a pressure chamber 55, in which a partitioning bellows 57 rolls off, being moved by a piston plate 56. Via a piston rod 58, the piston plate 56 joins the wheel mass 59 to the body mass 60, for instance of a vehicle; the pressure chamber 55 is contained in the body mass. The pressure chamber 55 communicates via a switchover valve 60a with a mechanism 61 that determines the springing properties of the suspension system. In a cylinder device 62, the mechanism 61 contains an adjusting piston 63, which is axially adjusted by a controlled drive from outside, in this case obeying sensor signals for example relating to acceleration, vehicle velocity, steering deflection, road condition and the like; as a result, the spring stiffness of the system can be predetermined as a function of the position of the piston 63. If the control drive for the piston 63 is lacking, an anti-locking device 64 serves to assure piston stoppage, so that the spring stiffness remains substantially constant. The piston 63 is seated in the cylinder unit with a certain leakage play A23, producing a static pressure equilibrium. The pressure chamber 55 also communicates via a line 65 with a load leveler, and an adjusting valve 66 is provided which joins the line 65 either to a pressure medium supply line 67 or to an outlet line 68. This suspension system with adjustable spring stiffness by means of arbitrary controllable predetermination of the position of the piston 63 is particularly advantageously augmented by means of a damping device such as that explained above and as shown at 69 in FIG. 14. From the many signals for adjusting the spring stiffness, obtained for instance from appropriate sensors, it is then possible for these signals, optionally after appropriate preparation to be used to adjust the damper valve or generally to drive the damper, or vice versa, and at the same time position signals can also act upon the load leveler.

All the characteristics described in the specification, recited in the ensuing claims and shown in the drawing may be essential to the invention, either individually or in any arbitrary combination with one another.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An apparatus for damping courses of motion of two bodies or masses separated from each other and moving relative to one another and in their absolute positions at variable speeds, in particular for damping resilient wheel suspension systems in vehicles, road vehicles, buses, railways and the like, comprising a cylinder, a piston displaceable in said cylinder, first and second work chambers in said cylinder, said cylinder and said piston being connected to a respective one of said bodies, a single variable pressure medium damper control valve being arranged to effect a variable flow of a pressure medium to and fro between at least one work chamber of said first and second work chambers, a hydropneumatic reservoir connected relative to said control valve, a signal control means, first sensor means adapted to determine a relative speed of said two bodies relative to one another and to direct a corresponding first signal to said signal control means, second sensor means adapted to determine an absolute speed of at least one of the bodies independently of one another to thereby produce a corresponding second signal which is directed to said signal control means, said first and second signals representing a combined damping force ($F_d = B_A \cdot V + B_p V_{rel}$) having an active damping coefficient ($B_A$) and a passive damping coefficient ($B_P$) correlated to a body velocity V and a relative speed $V_{rel}$ respectively, said variable pressure medium damper control valve including a valve opening adjusting member being configured such that said valve adjusting member rotates effectively to vary fluid flow of two branch lines connected thereto in accordance with a signal received from said signal control means, one rotational direction supplying a tension stage and one rotational direction supplying a compression stage, a first fluid line that connects said first work chamber via a first flow connection to one portion of said variable pressure medium damper control valve, at least one one-way check valve connected in series with at least one of said first and second work chambers and a connection of said hydropneumatic reservoir relative to said control valve, a position of said control valve adjusting member relative to said first fluid line being controlled via said first and second sensor means and said signal control means, said valve adjusting member being adapted to assume different rotational positions relative to said first flow connection thereby providing a lesser pressure medium flow relative to a second flow connection with a simultaneous greater pressure medium flow relative to said first flow connection and vice versa to generate different flow resistance for said damping force ($F_d$) applied and acting in different directions and further to generate asymmetrical damping properties for a respective predetermined position of said valve adjusting member as determined by said signal control means for said valve adjusting member to enable the movement of said valve adjusting member continuously out of a maximum opening position for at least one of said compression stage and said tension stage and into an arbitrary intermediate position to thereby attain a semi-active damper system, such that whenever a combined damping force determined by said signal control means in accordance with signals from said first and second sensor means has an algebraic sign (+ or −) opposite that of the damping forces made necessary by said courses of motion of the two bodies, said damping force is substantially reduced to zero (F=0) and said vehicle has a smooth ride.

2. An apparatus as defined by claim 1, in which one of said work chambers is arranged to communicate via a connecting line provided with two branch lines, each of said branch lines including oppositely disposed check valves, said branch lines being arranged to communicate with said variable pressure medium damper valve and said hydropneumatic reservoir.

3. An apparatus as defined by claim 1, in which said piston is arranged to receive said at least one check valve and said damper valve.

4. An apparatus as defined by claim 3, in which said piston is provided with a rotatable cup-shaped valve member which is arranged to provide arbitrarily asymmetrical flow resistance, said cup-shaped member having means defining openings comprising two rows of individual flow windows which are aligned with respectively associated adjacent flow openings which are further arranged to communicate with said upper and lower work chambers and wherein said flow windows in said two rows are offset relative to one another by one increment width for asymmetrically varying the flow, whereby low pressure conditions and high flow conditions can be attained.

5. An apparatus as defined by claim 3, in which said piston is hollow and further includes a hollow rod which communicates with said upper and lower work chamber, said hollow piston further being adapted to receive said variable damper valve having a rotating valve member, said rotating valve member being actuatable through said hollow piston rod by a control rod, said damper valve further including means in communication via flap-type check valves with said upper and lower work chambers and further that said hollow piston rod simultaneously connects said one damper valve means with said hydropneumatic reservoir.

6. An apparatus as defined by claim 5, in which said variable damper valve is part of an air suspension system, in which a pressure chamber closed off by a roller bellows is arranged to communicate via a switchover valve with a piston cylinder apparatus that adjusts the spring stiffness.

* * * * *